No. 694,759. Patented Mar. 4, 1902.
G. C. LATHROP.
NEST FOR POULTRY.
(Application filed July 16, 1901.)
(No Model.)
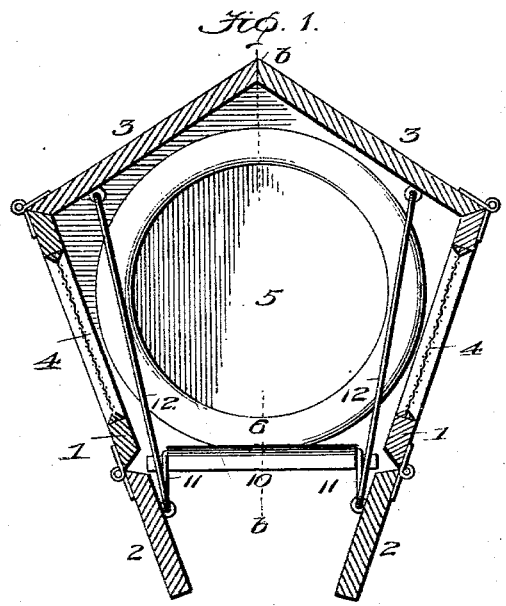
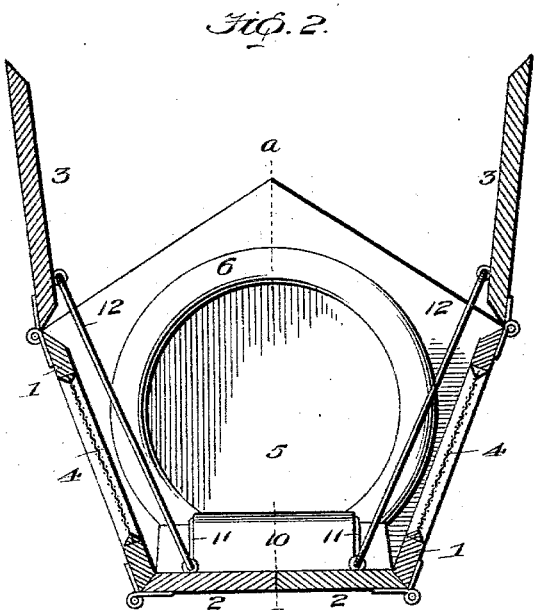
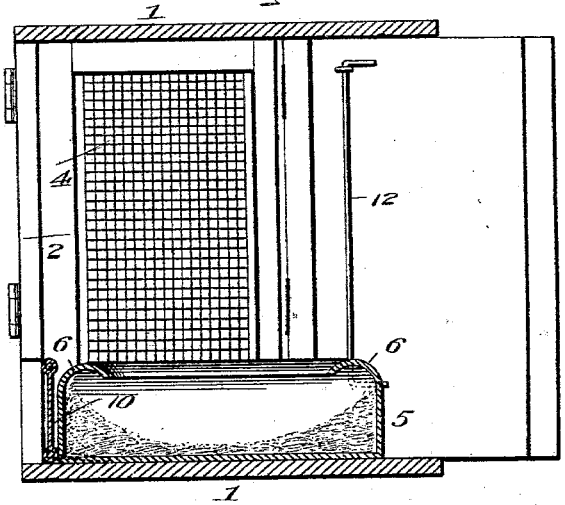
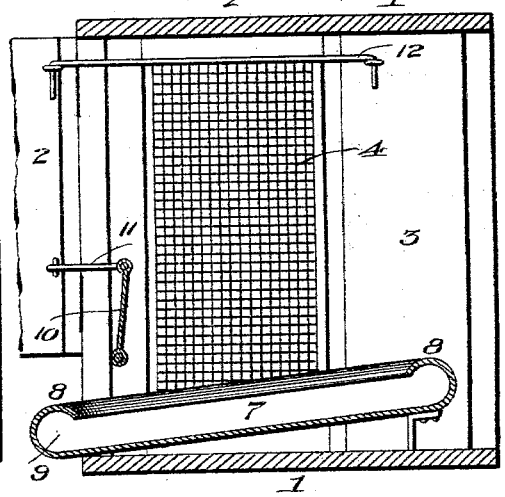
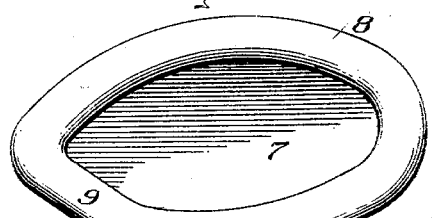
Witnesses
Inventor
George C. Lathrop
by Johnson & Johnson
Attorneys
THE NORRIS PETERS CO., PHOTO-LITHO., WASHINGTON, D. C.

UNITED STATES PATENT OFFICE.

GEORGE CHARLES LATHROP, OF WASHINGTON, DISTRICT OF COLUMBIA.

NEST FOR POULTRY.

SPECIFICATION forming part of Letters Patent No. 694,759, dated March 4, 1902.

Application filed July 16, 1901. Serial No. 68,471. (No model.)

*To all whom it may concern:*

Be it known that I, GEORGE CHARLES LATHROP, a citizen of the United States, residing at the city of Washington, in the District of Columbia, have invented certain new and useful Improvements in Nests for Poultry, of which the following is a specification.

In the production of a laying and sitting nest my aim is to protect the eggs from incubation as they are delivered from the fowl, to increase the production by increasing the capacity of the sitting fowl for covering and properly incubating a greater number of eggs, and to provide a housing wherein the laying and sitting appliances are made interchangeable and the housing used without either as a closure for the care of the chicks.

As a means of closing the nest when the fowl is either laying or sitting provision is made for automatically shutting the outside doors and opening the inside doors by the entrance of the fowl into the closure.

In the drawings, Figure 1 is a horizontal section of a closure which contains the sitting-nest, the outside doors being open for the entrance of the fowl, and a fowl-actuated device 10 in position to receive the fowl whereby to effect by her weight the closing of the outside doors and by their movement open the inside doors, as in Fig. 2, the fowl thereby trapped and having free access to the inside yard or room only. Fig. 2 shows a like section, the outside doors having been closed by the entrance of the fowl and the inside or yard doors open. Fig. 3 is a vertical section on the line *a a* of Fig. 2, showing the sitting-nest in place and the inside-yard doors open, the links 12 being unhooked from the doors 2. Fig. 4 is a like vertical section on the line *b b* of Fig. 1, the outside doors open, the laying-nest being substituted for the sitting-nest, and the trap plate or device 10 in position to form a perch for the fowl to close the doors when the fowl enters for laying, the laying-nest being inclined and its lowest side extending outside of the closure to form a pocket 9, into which the egg rolls as soon as it is laid. Fig. 5 shows the laying-nest in perspective with its circumferential egg receiving and protecting trapping-chamber 9.

As a nest-closure a box 1 is provided of suitable form and size, with double doors 2 and 3 hinged at opposite sides thereof, and the box is used so that one pair of its doors 2, which I call the "outside" doors, will open into the yard where the fowls are kept. The other pair of doors 3 will open into a house or yard where the nest-box is situated, so that the fowls can leave the nest at will whether laying or sitting, and thus give them needed freedom of the closure into which the nest opens. The two opposite sides of the closure are covered with wire screens 4 for light and ventilation, especially when both sets of doors are closed, as at night, or when the fowl is sitting or brooding over her chicks and it is important to protect her and them from rats and the usual destructive pests.

As a sitting-nest I provide a circular receptacle 5, with a flat bottom and vertical sides, terminating in inward turned or overhanging rim 6, so that the opening at the top is entirely closed by the sitting hen to exclude air from the eggs, to husband the warmth of the hen, and to prevent the chicks when hatched from getting out from under the mother. This is one of the features of my improvement, and in the preparation of the rimmed nest it is partially filled with dust or straw, so that the hen in making it concave thereby raises the seating well under the overhanging rim 6, the better to hold the eggs properly grouped, affording thereby facility for grouping a larger number of eggs and to exclude the air. To adapt this closure for laying, the sitting-nest is removed and a laying-nest 7 is substituted, as in Fig. 4. This laying-nest has a flat bottom, with a circumferential overhanging rim 8, adapted to form a trapping-chamber 9 for the egg at the moment it is laid and deliver it free of the hen outside of the nest-box. For this purpose the nest is inclined downward toward the outer doors, where it extends a short distance outside of the box under the doors, which part of the trapping-chamber forms a sort of pocket 9 to catch and to hold the eggs away from and free from danger of being broken and eaten by the hen and where they are exposed to the open air. This is an important feature of my improvement, inasmuch as if the egg is held under the hen and heated thereby it prevents the egg from being kept as long as it could be if allowed to escape at once from under the hen. In this connection it is seen, referring to Fig. 4, that the hen naturally sitting with her head toward the upper or raised end of the nest, which is toward the open doors where the light is brightest, will deliver the egg at the lowest end of the nest, where it will drop and roll into the pocket 9 under the doors 2, which will be then closed. In Fig. 5 the pocket 9 of this tubular bordered laying-nest is seen as an oblated part of the circular trapping-chamber, and into this pocket the eggs roll by the incline of the bottom.

The provision of a flat-bottomed nest with a tubular circumference forms an open top which surrounds the hen when laying and from which the eggs can be removed from outside of the box, the tubular circumference forming, in fact, a closure which the hen practically fills.

In using the box-nests interchangeably for setting and for laying the doors are required to be opened and closed in a certain way. This is especially important when the box is used with a laying-nest as in Fig. 4. The nest being properly placed and the doors 2 2 being open for her entrance therein, it becomes necessary to close these doors at which she entered, as in Fig. 2. For this purpose provision is made for automatically effecting their closure by the weight of the hen on a tilting trap device at the threshold of the doorway, as I will now describe. Pivotally mounted across the doorway above the egg-chamber is a tilting plate 10, the position of which when the doors 2 are open is vertical, as in Figs. 1 and 4, and forms a sort of barrier to the egg-chamber. In this position the lower edge of the tilting plate forms its pivot-mounting, and its upper free edge is connected at each end to each of the doors by links 11, and the fowl in entering the doorway will perch upon the upper free edge of the plate, and bearing it down inward pull with it the links 11, and thus close the doors and protecting her from outside interference, and thus her pedigree as a layer can be ascertained. The closing of the outside doors in this way is utilized as the means of opening the opposite pair of doors 3 to give freedom for the hen to go out into the room into which the nest opens. This means consists of links 12, which connect the outside doors 2 and the inside doors 3 in pairs, as in Figs. 1 and 2, so that the opening and the closing of the outer pair of doors controls the opening and the closing of the other pair. When, however, it is desired to close both sets of doors, the links connecting them are disconnected from the outside set of doors, as in Fig. 3, thereby allowing the inside doors to be closed by hand for inclosing the sitting hen at night or at other times with her chicks. The box so closed can be carried and placed where desired.

When the box is used with a sitting-nest, as in Fig. 3, the pivoted perch-plate 10 is detached from its door-connecting links 11 and hangs out of the way, as in Fig. 3. So also the doors connecting the links 12 are disconnected, so that the doors are closed and opened by hand to confine and protect the hen and to allow her freedom during the day, as in Fig. 3.

Obviously by the removal of the nests and the disconnection of the doors from their controlling-links the box can then be used solely as a shelter-house for the hen and her chicks.

Referring to Fig. 4, it will be noted that between the lower ends of the entrance-doors 2 and the bottom of the closure there is an opening through which the trap part of the laying-nest extends outside of the closure, whereby to allow access outside of the closure to the trap of the nest while the doors are closed. In this figure, which shows the laying-nest, the door 2 is shown as open and the tilting perch-plate 10 standing up to form the entrance-perch for the chicken. That part of the nest at its lowest end, which I call the "pocket" 9, projects beyond the bottom of the box, and therefore beyond its vertical walls, so that when the doors 2 2 are closed this oblated pocket part will form a trap extension outside of the box and sufficiently uncovered to expose the eggs, which may roll down therein outside of the closed box, so that they can be taken out. The facility for such removal is enhanced by the opening which the short doors form when closed over the lower egg-collecting part. Looking at Figs. 4 and 5, it will be seen that the egg laid in any part of the flat inclined nest will roll down into the pocket part 9 outside of the closure, where it can be seen and taken out.

While in the laying-nest, Fig. 4, the opening under the doors when closed facilitates the removal of the eggs from the trap part of the pan, which projects outside of the closed doors. Yet, looking at Fig. 3, the doors 2 2 must be closed when the sitting-nest is used, and in this case the opening beneath the doors must be closed to exclude cold air. For this purpose the perch-plate 10 is arranged so that when turned down it will close the opening, and thereby form a cover for that side of the nest which is next to the doors and wholly within the closure. The perch-plate, therefore, while serving as the means of automatically closing and opening the two sets of doors in the way stated to prepare the nest which projects outside of the closure for the laying hen, serves also to prepare the nest for the sitting hen wholly within the closure by its function as a drop-plate.

I claim—

1. In a poultry-nest and in combination with a suitable closure or housing having ingress and egress doors hinged at opposite sides of the nest, means for connecting the doors whereby the opening and closing of ingress-doors will close and open the egress-doors, and means whereby the doors are thus opened and closed by the entrance of the fowl into the closure.

2. In a poultry-nest, the combination with a closure or housing to receive interchangeable laying or sitting nests, ingress and egress openings and doors therefor the ingress-doors of which are so hung as to provide an egg-removal opening beneath their lower ends and through which a portion of the laying-nest extends, and a plate pivotally mounted and closing said opening to exclude the air from the closure when the sitting-nest is in use, substantially as described.

3. In a poultry-nest, a closure or housing having ingress and egress openings and doors therefor, ingress-doors forming an opening beneath their lower ends, and a removable laying-nest having a flat bottom, an overhanging rim, one side formed to project as a covered trap through said opening beneath the doors, and means whereby the flat bottom of the rimmed nest is supported freely upon the bottom of the closure to incline the nest with its trap part external to the closure.

4. In a poultry-nest, a removable laying-nest having a flat bottom surrounded by an overhanging curved rim, the bottom and the curved rim oblated at one side to form a covered trap, and legs on the under side at the opposite end of the nest whereby it is freely supported with its oblated side at its lowest level.

5. In a poultry-nest and in combination with a closure or housing having ingress and egress doors hinged at opposite sides of the nest, links connecting the doors whereby the opening and the closing of the ingress-doors will close and open the egress-doors respectively, and a tilting plate or perch pivoted across the threshold of the entrance-doors and links connecting the tilting bar with said ingress-doors, whereby the weight of the fowl is caused to close and open the doors.

6. A poultry device for interchangeable laying and sitting nests consisting of a closure or housing provided on two of its sides with ingress and egress openings, doors vertically hinged in pairs, for said openings, links connecting the doors so that the closing of the ingress pair of doors will open the egress pair, the ingress pair being hung to provide an opening beneath them, screens closing the two other sides of the housing, a horizontal pivotally-mounted plate adapted to form a perch above said opening when the doors are open and a drop-plate to close said opening when the doors are closed and links connecting the said plate and ingress-doors whereby the said plate is controlled in its positions as a perch or as a drop-plate according as the laying or the sitting nests may be used.

7. A poultry-nest consisting of a closure having suitable ingress and egress doors, the ingress-doors having an opening between their lower ends and the floor of the closure, and a flat laying-nest freely seated upon the floor, inclining toward the ingress-doors having an inward-curved overhanging rim and terminating at its lowest end in a trap for the eggs external to the closure.

In testimony whereof I affix my signature in presence of two witnesses.

GEORGE CHARLES LATHROP.

Witnesses:
A. ROLAND JOHNSON,
GUY H. JOHNSON.